(12) United States Patent
Wang et al.

(10) Patent No.: US 8,903,023 B1
(45) Date of Patent: Dec. 2, 2014

(54) ADAPTIVE BLUETOOTH RECEIVER AND METHOD

(71) Applicant: Beken Corporation, Shanghai (CN)

(72) Inventors: Weifeng Wang, Shanghai (CN); Yiming Huang, Shanghai (CN); Mingsheng Ao, Shanghai (CN)

(73) Assignee: Beken Corporation, Shanghai (CN)

( * ) Notice: Subject to any disclaimer, the term of this patent is extended or adjusted under 35 U.S.C. 154(b) by 0 days.

(21) Appl. No.: 13/913,379

(22) Filed: Jun. 7, 2013

(30) Foreign Application Priority Data

May 8, 2013 (CN) .......................... 2013 1 0170139

(51) Int. Cl.
*H03D 3/00* (2006.01)
*H04L 27/14* (2006.01)
*H04B 1/16* (2006.01)

(52) U.S. Cl.
CPC ................ *H04L 27/142* (2013.01); *H04B 1/16* (2013.01)
USPC ........... 375/334; 375/272; 375/224; 375/316; 375/345

(58) Field of Classification Search
CPC ......... H03D 3/008; H04B 1/30; H04L 25/063
USPC .................................................. 375/334, 272
See application file for complete search history.

(56) References Cited

U.S. PATENT DOCUMENTS

| 7,394,881 | B2 * | 7/2008 | Jensen ........................... 375/350 |
| 2003/0157909 | A1 * | 8/2003 | Atkinson et al. ............... 455/130 |
| 2005/0250459 | A1 * | 11/2005 | Tervaluoto et al. ......... 455/127.2 |
| 2012/0307676 | A1 * | 12/2012 | Chan et al. ..................... 370/252 |
| 2013/0251078 | A1 * | 9/2013 | Bachl et al. ................... 375/345 |

* cited by examiner

*Primary Examiner* — Qutbuddin Ghulamali
(74) *Attorney, Agent, or Firm* — Perkins Coie LLP; Aaron Wininger

(57) ABSTRACT

A Bluetooth receiver comprises a RF front end configured to receive a Bluetooth signal including a preamble and 34-bit pseudo-number (PN); a DC estimator communicatively coupled to the RF front end; and a frame synchronizer communicatively coupled to the DC estimator. The DC estimator is configured to perform DC offset estimation by determining an average value of samples of the preamble and the frame synchronizer is configured to use the 34-bit PN for frame synchronization.

8 Claims, 3 Drawing Sheets

ADAPTIVE BLUETOOTH RECEIVER AND METHOD

CLAIM OF PRIORITY

This application claims priority to Chinese Application number 201310170139.6 entitled "ADAPTIVE BLUETOOTH RECEIVER AND METHOD", filed on May 8, 2013, which is incorporated herein by reference.

TECHNICAL FIELD

The present application relates to signal interference and more particularly, but not exclusively, to utilizing a Bluetooth frame structure to reduce interference, sensitivity and DC offset estimation.

BACKGROUND OF THE INVENTION

Conventionally, Bluetooth receivers may have incorrect DC offset estimation using an access code as the access code does not have an evenly distributed binary code.

Further, a Bluetooth receiver may lose one frame if there is large interference, as the gain control has one frame delay after RSSI detection.

Finally, a Bluetooth receiver has no equalizer to improve sensitivity, as there is no redundant training pattern in a Bluetooth packet.

Accordingly, a new Bluetooth receiver and method that overcome these issues are desirable.

BRIEF DESCRIPTION OF THE INVENTION

According to an embodiment of the invention, a receiver and method adaptively use the Bluetooth frame structure to improve accuracy of DC offset estimation, improve interference immunity and improve sensitivity.

In an embodiment, the receiver comprises a RF front end configured to receive a Bluetooth signal including a preamble and 34-bit pseudo-number (PN); a DC estimator communicatively coupled to the RF front end; and a frame synchronizer communicatively coupled to the DC estimator. The DC estimator is configured to perform DC offset estimation by determining an average value of samples of the preamble and the frame synchronizer is configured to use the 34-bit PN for frame synchronization.

In an embodiment, the method comprises: receiving with a RF front end a Bluetooth signal including a preamble and 34-bit pseudo-number (PN); performing DC offset estimation with a DC estimator communicatively coupled to the RF front end; and performing frame synchronization with a frame synchronizer communicatively coupled to the DC estimator. The DC estimator performs DC offset estimation by determining an average value of samples of the preamble and the frame synchronizer uses the 34-bit PN for frame synchronization.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Various aspects and examples of the invention will now be described. The following description provides specific details for a thorough understanding and enabling description of these examples. Those skilled in the art will understand, however, that the invention may be practiced without many of these details. Additionally, some well-know structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below, however, any terminology intended to be interpreted in any restricted manner will be overtly and specifically defined as such in this Detailed Description section.

Figure 1:
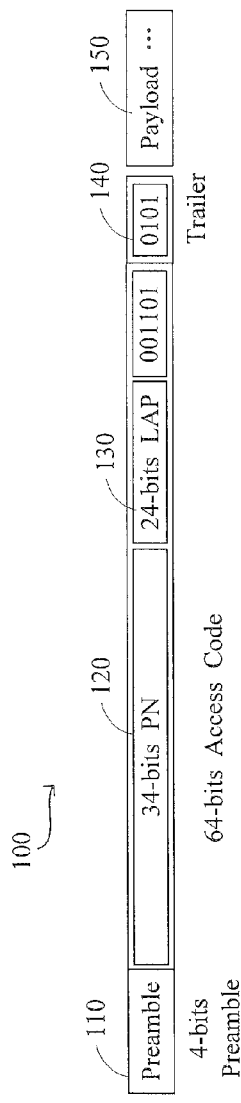
FIG. 1 is a block diagram illustrating a Bluetooth frame structure.

FIG. 1 is a block diagram illustrating an example Bluetooth frame 100 structure. The frame 100 comprises a 4-bit preamble 110, followed by a 64-bit Access Code that includes a 34-bit pseudo-number and a 24-bit LAN Access Profile (LAP), a trailer 140 and a payload 150. The access code is used for synchronization, DC offset compensation and identification.

Figure 2:
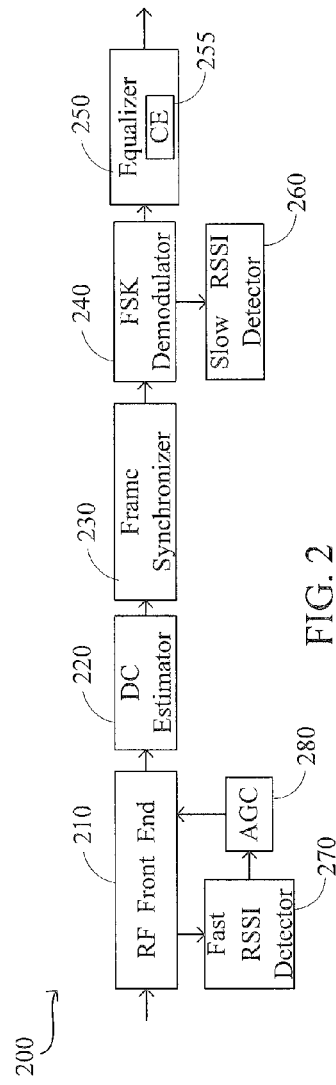
FIG. 2 is a block diagram illustrating a Bluetooth receiver according to an embodiment of the invention.

FIG. 2 is a block diagram illustrating a Bluetooth receiver 200 according to an embodiment of the invention. The receiver 200 comprises an RF front end 210 communicatively coupled to a DC estimator 220, which is communicatively coupled to a Frame Synchronizer 230, which is communicatively coupled to a Frequency Shift Keying (FSK) Demodulator 240, which is communicatively coupled to an equalizer 250. A fast RSSI detector 270 is communicatively coupled to an Automatic Gain Control (AGC) 280. Both the detector 270 and the AGC 280 are communicatively coupled to the RF Front End 210. A slow RSSI detector 260 is communicatively coupled to the FSK demodulator 240. The equalizer 250 includes a channel estimator (CE) 255.

The RF front end 210 receives a Bluetooth signal and performs initial processing as will be discussed further in conjunction with FIG. 3. The DC estimator 220 performs DC offset estimation by determining an average value of samples of the preamble 110. The frame synchronizer 230 uses the 34-bit PN 120 for frame synchronization. That is, synchronization is made by matching a known PN pattern with an input sample of the PN. The CE 255 uses the LAP 130 for channel estimation using maximum likelihood sequence estimation. The CE 255 will get the channel impulse response based on the received signal and the known pattern of the PN 120. The equalizer 250 can then use the channel impulse response to improve the sensitivity based on decision feedback error or maximum likelihood. The equalizer 250 will firstly do channel estimation with the access code, and then do channel compensation for the payload 150, to reduce the bit error rate in the payload 150. By default, the AGC 280 is set to maximum gain.

Figure 3:
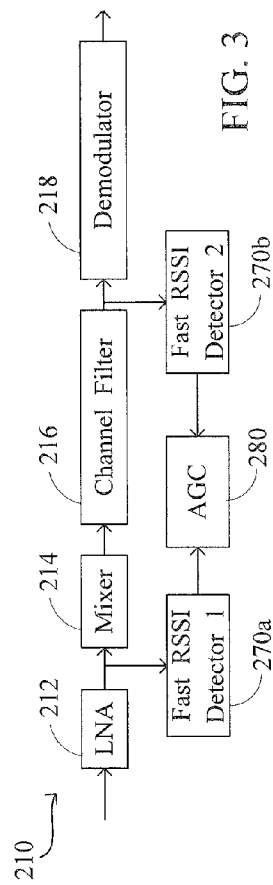
FIG. 3 is a detailed view of the front end of the receiver as illustrated in FIG. 2.

FIG. 3 is a detailed view of the front end 210 of the receiver 200 as illustrated in FIG. 2. The front end 210 comprises a Low Noise Amplifier (LNA) 212 communicatively coupled to a mixer 214, which is communicatively coupled to a channel filter 216, which is coupled to a demodulator 218. The Fast RSSI detector 270 includes a first detector 270a and a second detector 270b, which are both coupled to the AGC 280. The first detector 270a receives output of the LNA 212 and the second detector 270b receives output from the channel filter 216.

If there is large interference it is detected by the fast RSSI detector 270 and the AGC 280 is adjusted down. The fast RSSI detector 270 will detect two RSSI, one is the RSSI1 270a after the LNA 212, the other is the RSSI2 270b after the channel filter 216. The large interference is found if the RSSI1 is large, but the RSSI2 is small. The channel filter 216 is responsible for suppressing the interference. In addition, the preamble 110 and the PN 120 are used for the above-mentioned RSSI detection. The detector 270 may use a fast response time constant such as about 1 μs. Then the estimator 220 will use the trailer for DC estimation and the synchronizer 230 will use the LAP 130 for synchronization. Although the trailer 140 comes after the LAP 130, a buffer (not shown) can buffer both to enable the LAP 130 to use the DC estimated from the trailer 140. Further, the payload 150 uses the DC estimated from the trailer 140.

Figure 4:
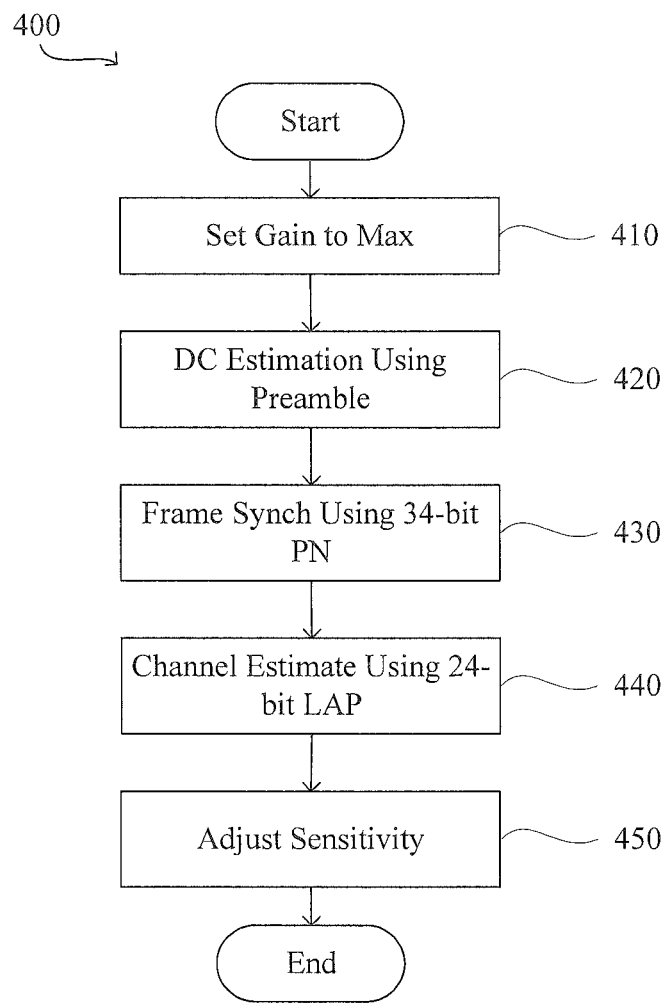
FIG. 4 is a flowchart of a method for receiving a Bluetooth signal according to an embodiment of the invention.

FIG. 4 is a flowchart of a method 400 for receiving a Bluetooth signal according to an embodiment of the invention. First, gain is set (410) to maximum. Then DC estimation is performed (420) using the preamble 110. Then frame synchronization is performed (430) using the PN 120. Channel estimation is then performed (440) using the LAP 130. Finally, sensitivity is adjusted (450) accordingly. The method 400 then ends.

Figure 5:
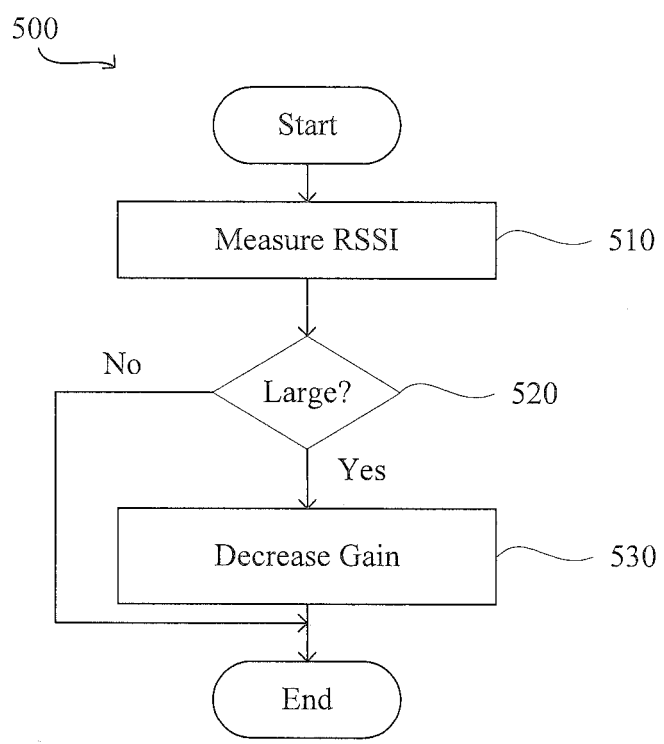
FIG. 5 is a flowchart of a method for adjusting gain according to an embodiment of the invention.

FIG. 5 is a flowchart of a method 500 for adjusting gain according to an embodiment of the invention. A first RSSI is measured (510) after the LNA 212 and a second RSSI after the channel filter 216. If (520) the first RSSI is high while the second RSSI is low, then the gain is lowered (530). In an embodiment, if the first RSSI>RSSI_THD, and the second RSSI<RSSI_THD, then the gain is lowered (530), wherein RSSI_THD is about 3 dB below a saturation level of the receiver 100. The gain is lowered (530) until the first RSSI is no longer high and then second RSSI is no longer low. The method 500 then ends.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A Bluetooth receiver, comprising:
   a RF front end configured to receive a Bluetooth signal including a preamble and 34-bit pseudo-number (PN);
   a DC estimator communicatively coupled to the RF front end;
   a frame synchronizer communicatively coupled to the DC estimator;
   wherein the DC estimator is configured to perform DC offset estimation by determining an average value of samples of the preamble and the frame synchronizer is configured to use the 34-bit PN for frame synchronization;
   a Frequency Shift Keying (FSK) demodulator communicatively coupled to the frame synchronizer;
   an equalizer communicatively coupled to the FSK demodulator;
   wherein the Bluetooth signal further includes a Local Area Network (LAN) access profile and the equalizer includes a channel estimator configured to use the LAN access profile for channel estimation.

2. The receiver of claim 1, further comprising an Automatic Gain Control (AGC) circuit communicatively coupled to the RF front end and a Received Signal Strength Indicator (RSSI) detector communicatively coupled to both the RF front end and the AGC.

3. The receiver of claim 2, wherein the RF front end comprises:
   a low noise amplifier;
   a mixer communicatively coupled to the low noise amplifier;
   a channel filter communicatively coupled to the mixer; and
   a demodulator communicatively coupled to the channel filter;
   wherein the RSSI detector includes a first and second RSSI detector and the first RSSI detector receives output of the low noise amplifier and the second RSSI detector receives output of the channel filter.

4. The receiver of claim 3, wherein the AGC is configured to lower gain when the first RSSI detector detects a RSSI higher than a threshold and the second RSSI detector detects a RSSI lower than a threshold.

5. The receiver of claim 4, wherein the threshold is 3 dB below a saturation level of the receiver.

6. A Bluetooth receiver, comprising:
   a RF front end configured to receive a Bluetooth signal including a preamble and 34-bit pseudo-number (PN);
   a DC estimator communicatively coupled to the RF front end;
   a frame synchronizer communicatively coupled to the DC estimator;
   wherein the DC estimator is configured to perform DC offset estimation by determining an average value of samples of the preamble and the frame synchronizer is configured to use the 34-bit PN for frame synchronization;
   an Automatic Gain Control (AGC) circuit communicatively coupled to the RF front end and a Received Signal Strength Indicator (RSSI) detector communicatively coupled to both the RF front end and the AGC;
   wherein the RF front end comprises:
      a low noise amplifier;
      a mixer communicatively coupled to the low noise amplifier;
      a channel filter communicatively coupled to the mixer; and
      a demodulator communicatively coupled to the channel filter;
   wherein the RSSI detector includes a first and second RSSI detector and the first RSSI detector receives output of the low noise amplifier and the second RSSI detector receives output of the channel filter.

7. The receiver of claim 6, wherein the AGC is configured to lower gain when the first RSSI detector detects a RSSI higher than a threshold and the second RSSI detector detects a RSSI lower than a threshold.

8. The receiver of claim 7, wherein the threshold is 3 dB below a saturation level of the receiver.

* * * * *